United States Patent [19]

Krug et al.

[11] Patent Number: 4,806,713
[45] Date of Patent: Feb. 21, 1989

[54] SEAT-CONTACT SWITCH

[75] Inventors: Martin Krug, Holzgerlingen; Horst Daham, Ostelsheim; Götz Mötting, Böblingen, all of Fed. Rep. of Germany

[73] Assignee: Daimler-Benz Aktiengesellschaft, Stuttgart, Fed. Rep. of Germany

[21] Appl. No.: 175,339

[22] Filed: Mar. 30, 1988

[30] Foreign Application Priority Data

Apr. 7, 1987 [DE] Fed. Rep. of Germany ....... 3711677

[51] Int. Cl.⁴ ............................................ H01H 21/26
[52] U.S. Cl. .................................. 200/85 A; 180/273; 307/105 B; 340/667
[58] Field of Search .............. 307/105 B, 119; 200/34, 200/85 R, 85 A, 290, 291, 318, 323; 340/667; 180/273

[56] References Cited

U.S. PATENT DOCUMENTS

| 1,809,651 | 6/1931 | Van Amburg | 200/85 A |
| 1,821,264 | 9/1931 | King | 340/667 |
| 3,451,501 | 6/1969 | Applegate | 180/273 |

FOREIGN PATENT DOCUMENTS

| 859778 | 12/1952 | Fed. Rep. of Germany. |
| 2204318 | 8/1973 | Fed. Rep. of Germany. |
| 2407299 | 8/1974 | Fed. Rep. of Germany. |
| 3542627 | 4/1987 | Fed. Rep. of Germany. |

OTHER PUBLICATIONS

"Übersicht Über Kinematik/Getriebele" (Survey of Kinematics/Gear Technology) Knab, H.-J., 2nd Edition, Nuremberg 1930, Selbstverlag, p. 76, Figure 574.

Primary Examiner—Gerald P. Tolin
Attorney, Agent, or Firm—Barnes & Thornburg

[57] ABSTRACT

A seat-contact switch for generating a "seat occupied" signal is combined into a compact constructional unit with an axially resilient actuating device, which extends in a straight line between the seat suspension and the seat frame and which automatically compensates for elastic and permanent deformation or settling phenomena of the seat suspension resulting in a reduction of its unloaded length and which utilizes an adjusting screw connected between the seat and seat frame which screw causes adjustment of the point of make-break contact for the "seat occupied" signal.

20 Claims, 2 Drawing Sheets

SEAT-CONTACT SWITCH

BACKGROUND AND SUMMARY OF THE INVENTION

The invention relates to a seat-contact switch for generating a "seat occupied" signal when a seat suspension approaches a seat frame as a result of a seat loading, utilizing an actuating device which has a moveable part articulatable on the seat suspension and a base part fastenable to the seat frame and which, as a result of relative movement between the moveable part and its base part, brings switch contacts into and out of conductive contact. The switch is self-adjusting to compensate both for elastic and permanent deformations of the seat suspension in order to prevent continuous actuation of the seat-contact switch when the seat suspension undergoes permanent deformation.

A seat-contact switch is known from German Auslegeschrift No. 2,204,318 wherein its actuating device has a first long spring shackle which is articulated on a seat spring at a free end and which is fastened at its other end to a pivotable shaft by means of a volute-sprinq slip coupling. Connected firmly to the shaft is a second spring shackle which carries a switch contact at its free end.

The shaft is mounted as a base part on a seat frame and can be pivoted only over an angle limited by stops. When the seat spring is compressed under a load exerted on the seat surface, the first long spring shackle is pivoted about the shaft and takes the latter with it, via the volute-spring slip coupling, until its further rotation is halted by one of the stops. At the same time, the second spring shackle is pivoted until its switch contact comes in contact with a second switch contact fixed to the seat frame. If the seat spring is compressed even further, the volute-spring slips on the shaft and allows a free-wheel movement of the first spring shackle relative to the shaft. When the seat spring expands, the first long spring shackle is guided back again and takes the shaft rearwardly with it, thereby at the same time separating the two switch contacts until the shaft is halted by the other stop.

Under normal circumstances, that is to say, when there is only elastic deformation of the seat spring, the volute-spring will also slip back into its initial position on the shaft after the seat spring has been relieved. However, permanent deformation of the seat spring results in a slight shifting of the volute-spring on the shaft in the loading direction in relation to the initial position, this being sufficient to compensate for permanent deformations caused by fatigue.

Precisely when the particular seat is in frequent use, the volute-sprinq slip coupling is in danqer of wear, and when wear has progressed, it can slip even when the shaft does not yet rest against a stop. Under extreme circumstances, the result of this can be that the switch contacts are kept continuously closed even when the seat is unoccupied, for example, if the second spring shackle, as a result of its own weight, rotates the shaft counter to the weakened frictional effect of the volute-spring. Indeed, the latter does not need to be pivoted up to one of the stops before the switch contacts close. Furthermore, the unavoidable hysteresis of the volute-spring coupling, permanent deformations of the two spring shackles, and inertia-related vibrations of the second spring shackle can also lead to faults and malfunctioning of the known actuating device.

German Offenlegungsschrift No. 2,407,299 makes known a seat-contact switch which is fastened to a seat spring and which is actuated as a result of the deformation of the seat cushion in relation to the seat spring.

Although permanent deformations of the seat spring do not have any disruptive influence on this, nevertheless, it is actuated continuously when the seat cushion itself has undergone wear as a result of sitting.

A seat-contact switch insertable between the seat suspension and seat cushion and without an adjusting device is also known from German Patent Specification No. 3,542,627.

An end detent means of the type used as the free-wheel in the seat-contact switch according to the invention is known from the manual "Übersicht Über Kinematik/Getriebelehre" ("Survey of Kinematics/Gear Technology") (Knab, H.-J., 2nd edition, Nuremberg 1930, Selbstverlag, page 76, FIG. 574).

A high-voltage switch, switchable by means of a coarse-pitch threaded spindle is known from German Patent Specification No. 859,778.

Seat-contact switches not only are used for safety-belt fastening checks, but also serve for monitoring the occupation of passenger seats, where a passenger is protected by an air-bag restraint system in the event of accidents caused by collisions. In this particular use, a seat-contact switch can, by means of a blocking signal, prevent the air-bag filling operation from being triggered by remote control when the seat is unoccupied.

However, such a protective function can be achieved only with seat-contact switches which also function reliably over the long term.

The object of the invention is, therefore, to provide a seat-contact switch that works reliably over the long term, even under the greatest possible stress exerted on the seat, and at the same time does not take up a large amount of space within a seat.

In particular, an articulatable moveable means of the seat suspension is connected to its base part of the seat to be coaxially displaceable. Said moveable means being prestressed by a spring means, extending from the base part toward the seat suspension and against a stop means on said base part; said actuating device includes an adjusting means whose unloaded natural length is adjusted by means of a mechanically driveable adjusting screw means comprising an adjusting nut and a threaded bolt, one of which is non-rotatably connected to the seat suspension, while the other is rotatably connected to a free-wheel means which exerts a blocking effect on the rotatable one of the nut or bolt to prohibit rotation in a return direction. The difference in length between te distance from the seat suspension to the seat frame, caused by deformation of the seat suspension and said unloaded natural length of the actuating device, are compensated up to a maximum value by insertion of a deformation elastic member means between the adjusting nut and adjusting screw and wherein after the maximum value is reached, the elastic member means is moved a least partially into a changed position along the threaded bolt, when the seat suspension is relieved of its seat loading.

It is further advantageous if a first switch contact means is guided in said base part for displacement away from a base part stop against a spring force; and wherein another switch contact means is moveable by said moveable means as a result of displacement of the moveable means relative to the base part under seat loading to cause the first and other switch contact means to initially be brought into electrical contact with one another and then to have the first switch contact displaced away from its base part stop.

Alternatively, the first switch contact means is fixedly arranged on the base part and another switch means is connected with said moveable means, wherein the first switch and another switch contact means are electrically connected when the seat suspension is unloaded, and are separated when the moveable means moves relative to the base part upon seat loading.

It is advantageous if the another switch contact means is located on a moveable contact carrier means when the seat suspension is unloaded and is prestressed against a stop on the base part as a result of bias by another spring, and wherein the moveable carrier is non-rotatably mounted on the base part.

This is especially true when said other spring is stretched between the moveable contact carrier and a spring mounting on the moveable means, or where said another spring is stretched between the moveable contact carrier and a spring mounting on the base part, and wherein a further spring is stretched between the spring mounting on the base part and a spring mounting on the moveable means.

It is also advantageous to have said adjusting screw means of the adjusting device be rotated as a result of the displacement of the moveable means relative to the base part by means of a coarse-pitch helical gear limited in rotation direction by free-wheel means. The drive means for rotating the helical gear being provided on the base part with said adjusting nut screwable on fine threads on said thread bolt and said helical gear includes a sleeve with the coarse thread attached to the free-wheel. With this construction, one can have said threaded bolt articulated to the seat suspension in a non-rotating manner relative to its longitudinal axis, and said adjusting nut fixedly connected to the sleeve or, alternatively, have said threaded bolt fixedly connected to said sleeve, and said adjusting nut articulated to said seat suspension.

It is also advantageous to have said free-wheel means have spring pawl means engaging in saw teeth on a toothed ring, wherein said sp ring pawl means are connected to the coarse pitch helical gear and said toothed ring is mounted on a moveable contact carrier means carried by the base part.

Alternatively, said spring means could be connected to the moveable contact carrier and said toothed ring connected to the coarse pitch helical gear.

It is also advantageous to have said base part designed as a hollow cylinder surrounding the sleeve, and said drive means designed as spring hooks projecting into said hollow cylinder and engaging into flights of the coarse thread, arranged on the outside of the sleeve. With this construction, the flights of the coarse thread are made saw-toothed-shaped, to allow for the drive means to jump from one flight to the next when said free-wheel means exerts its blocking effect and the seat suspension is unloaded. The best results are obtained when said flights of the coarse thread extend at a pitch angle of 45° or less (preferably 30°) relative to the longitudinal axis of the sleeve.

It is further advantageous if said adjusting nut of the adjusting screw is configured as a disc with an internal thread center and having several radial slots starting from the nut thread and extending radially outward toward, but stopping short of the outer edge of the disc. With this construction, portions of the disc between the radial slots act as resilient sectors which are elastically deformable for compensating for the difference in length of the adjustable means after maximum value of said difference in length is reached, which construction causes said sectors to snap back automatically along the threaded bolt and again bring said internal thread into engagement with the bolt again.

By these arrangements, a very compact switch arrangement which is simple to mount and remove has been provided, without the seat construction needing to be affected in any appreciable way.

Because an adjusting screw driveable by means of a coarse-pitch thread is used, it is possible, if there is coaxial linear displacement of the base part and moveable part relative to one another, to change their mutual position of rest. That is, the free unloaded natural length of the two components together can be varied and, in special circumstances, reduced in order to compensate for settling processes of the seat suspension. This reduction takes place in steps under any loading of the seat suspension and more quickly than the latter can settle. When the seat is in the state of rest, there is therefore a difference in length arising from the distance between the points on the seat frame and seat suspension at which the seat-contact switch is articulated, on the one hand, and the distance between the points of articulation on the seat-contact switch itself, on the other hand. This difference in length results in a bracing of the seat-contact switch which, because of a suitable arrangement of its switch contacts, holds these contacts securely in their basic position when the seat is relieved. Since, as already mentioned, the adjustment of the switch always precedes the settling of the seat suspension, under normal circumstances, this bracing has to be removed again from time to time as a result of the automatic resetting of the adjusting device.

Other objects, advantages and novel features of the present invention will become apparent from the following detailed description of the invention when considered in conjunction with the accompanying drawings.

DETAILED DESCRIPTION OF THE DRAWINGS

Figure 1:
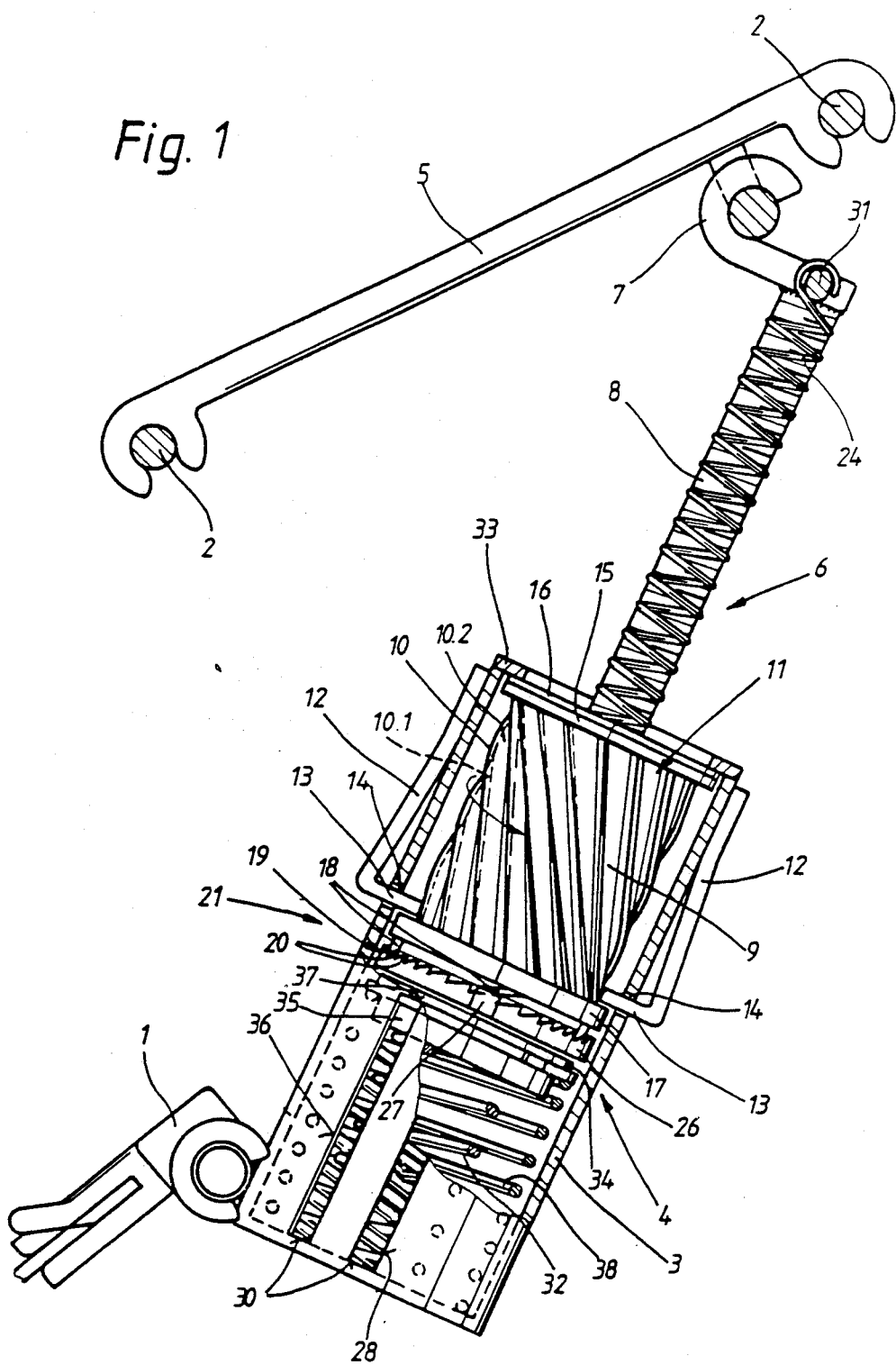
FIG. 1 shows a partially cut-away general view of the seat-contact switch.

The partially sectional view in FIG. 1 shows the seat-contact switch in the installation position indicated in a motor vehicle seat which is represented only by a mounting 1 on a seat frame (not shown), and by a seat suspension 2.

A cup-shaped base part 3 of an actuating device 4 is snapped in and pivotably attached to the mounting 1. A moveable part 6 of the actuating device 4 is articulated on the seat suspension 2, via an anchor plate 5, so that it can be snapped on by means of a holding hook 7.

The moveable part 6 has a fine thread bolt portion 8 and an adjusting device 9 to 23 described in more detail later. A moveable contact carrier 26 is guided by guide extensions 27 extended outwardly therefrom into longitudinal slots 28 of the base part 3 between an upper stop 29 (FIG. 2), and a lower stop 30 (FIG. 1). Helical tension springs 24, 24' are suspended between a spring mounting 31 of the holding hook 7, and in a first embodiment (24), on an outer edge 27 of moveable contact carrier 26 (left-hand side of FIG. 2), while in a second embodiment (24') (right-hand side of FIG. 2) between said outer edge 27 and outer edge 39 on the cover disc 33 of base part 3.

The moveable part 6 of the actuating device 4 is guided in the cup-shaped base part 3 of the latter so as to be coaxially displaceable and is prestressed, by means of a helical compression spring 32 supported between the bottom of the base part 3 and a bearing 23 abutting cover or disc 15 of sleeve 9 of the adjusting device 9 to 23, which in turn is held by fine threaded nut 16 (detailed at FIG. 4) attached to fine threaded bolt 8, against a cover disc 33 located at the end of the base part 3 facing the seat suspension 2.

An annular switch contact 34 is guided in longitudinally extending wall slots 36 (FIG. 1) in the base part 3 by means of a supporting ring 35 so as to be displaceable between stops 37, 30 and is prestressed against the stops 37, in the direction of the moveable contact carrier 26, by means of a further helical compression spring 38 having a larger diameter than the helical compression spring 32 and supported between the bottom of the base part 3 and the contact 34.

The outer face of sleeve 9 of the adjusting device 9-23 is equipped with flights 10 of a 30° coarse left-hand thread 11.

Spring hooks 12 are fixedly fastened to the upper outer face of the base part 3 and are guided through bores 14 in the wall of the base part 3 by means of angled ends 13, which each engage into the valleys between the flights of the coarse thread 11.

Towards the seat suspension 2, the sleeve 9 is closed off by the disc 15 and a fine-thread sheet-metal nut 16 screwed onto the fine thread bolt 8. When the actuating device 4 is in the relaxed state, that is, when the seat is unoccupied, the fine thread nut 16 rests with its outer edge against the cover disc 33 of the base part 3.

At the other end of the sleeve 9, facing the mounting 1 on the seat frame, the sleeve is equipped with a pawl carrier ring 17 (FIG. 1) carrying four spring pawls 18 which are distributed uniformly over its periphery and which point obliquely away from the sleeve 9 toward the moveable contact carrier 26. The latter, on it surface facing the sleeve 9, is equipped with a toothed end ring 19 with saw teeth 20. The spring pawls 18 and the toothed end ring 19 form a free wheel 21 which allows for rotation of the sleeve 9 and the pawl carrier ring 17 in one direction only, indicated by an arrow, but prevents rotation in the opposite direction, since the moveable contact carrier 26, although being longitudinally displaceable in the base part 3, is nevertheless non-rotationally guided in the base part 3.

The flights 10 of the coarse thread 11 are saw-tooth-shaped, their steeper flanks 10.1 coming into engagement with the spring hook ends 13 when, as a result of the loading of the seat suspension 2, the moveable part 6 of the actuating device 4 is displaced longitudinally downward in the base part 3 and counter to the force of the helical compression spring 32.

As a result of this engagement, the sleeve 9 is rotated during the displacement movement of the moveable part 6, and the fine thread nut 16, with a right-handed fine thread, is adjusted on the fine thread bolt 8 towards the holding hook 7 by a fraction of a revolution. At the same time, the spring pawls 18 jump one or two teeth further on the toothed end ring 19.

When the seat suspension 2 is relieved, the moveable part 6 is drawn out of the base part 3 again. The freewheel 21 exerts a blocking effect, since during a return rotary movement of the sleeve 9, the spring pawls 18 now engage on the steep flanks of the saw teeth 20. The spring hook ends 13 now running on the sloping flanks 10.2 of the respective fliqhts, climb up when the sleeve 9 is drawn out further, and jump over into the next flight.

Figure 2:
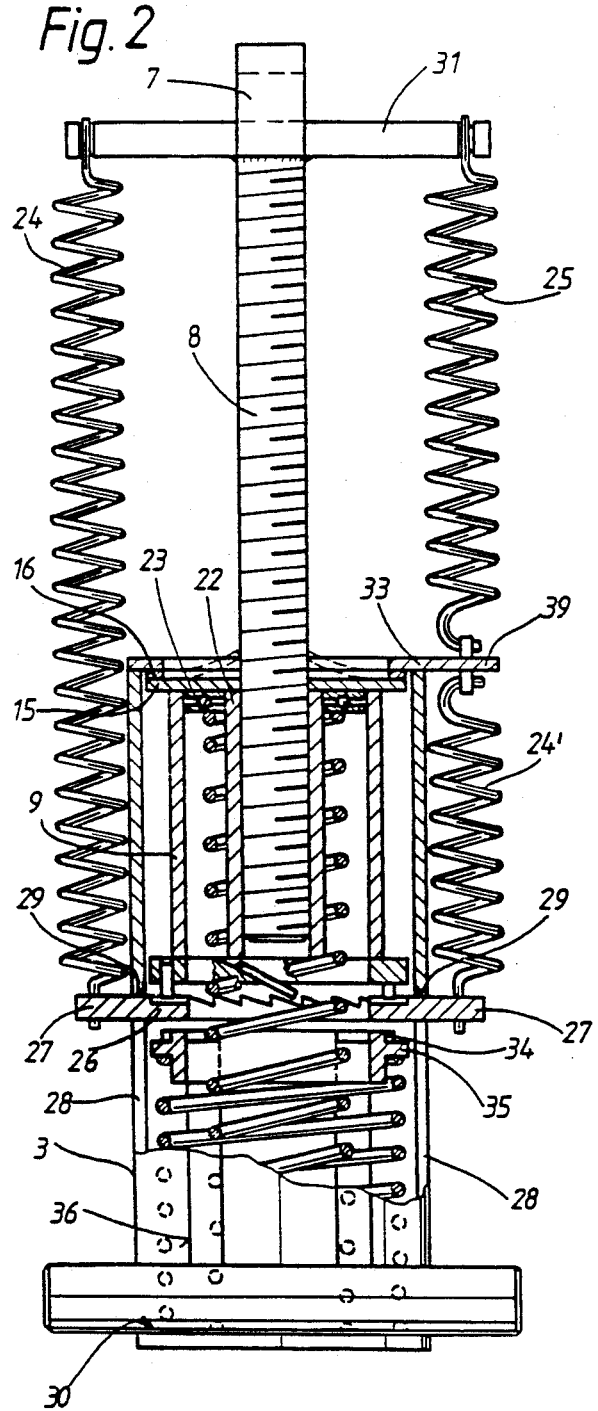
FIG. 2 shows a sectional view of two embodiments of the seat-contact switch, rotated through 90° from that of FIG. 1.

FIG. 2 shows a further sectional view of the seat-contact switch which is rotated through 90° relative to FIG. 1. Here, the sleeve 9 is cut away and shown in simplified form without the details of the coarse thread 11. The spring hooks 12 are likewise omitted.

Additional parts of the adjustinq devioe which are now shown include a guide tube 22 fastened to the disc 15 and guiding the fine thread bolt 8, and an axial ball bearing 23 which uncouples the helical compression spring 32 from the rotary movement of the sleeve 9, prestressed by this spring.

Furthermore, on one side of the actuating device 4, the continuous helical tension spring 24 is stretched between a guide extension 27 of the moveable contact carrier 26 and the spring mounting 31, while on the other side, as already mentioned above as a second embodiment, a helical tension spring 24' is stretched between the guided extension 27 of the moveable contact carrier 26 and a spring mounting 39 of the cover disc 33, and a further helical tension spring 25 is stretched between the latter spring mounting 39 and the spring mounting 31.

Of course, in practice, both sides are equipped equally with one continuous helical tension spring or with two separate helical tension springs, the advantage of the latter version being that, if a mounting 1 is defective or a holding hook 7 is defective, the seat-contact switch is drawn into its actuated position, signalling "seat occupied", by tension springs 25 between the holding hook 7 and the base part 3, a will be explained later. Such a defect may remain unnoticed for a relatively long period of time. However, the advantageous spring arrangement guarantees the functioning of a passenger protection device dependent on the seat-contact switch.

When the seat suspension 2 is loaded and the moveable part 6 begins to be displaced, after a short idle stroke, the moveable contact carrier 26 is brought into electrical contact with the annular switch contact 34. The moveable contact carrier 26 can itself consist completely of conductive material and can also carry an electrical conductive insert corresponding to the annular switch contact 34. In either case, this makes it possible for a make-break switch function to be performed. The connecting electrical wires (not shown) can be guided outwards in a simple way, for example, through the guide slots 28 or 36 in the base part 3.

Even if the longitudinal axis of the seat-contact switch is distinctly oblique relative to the direction of compression of the seat suspension 2, the actuating travel up to the closing of the switch is only a very small proportion of the total movement, so that the switch is closed irrespective of the weight of the passenger. The further movement of the seat spring is absorbed when the compression springs 32 and 38 are compressed. The adjusting device or its adjusting screw 8, 16 is adjusted a greater amount depending on the compression of the seat suspension.

Figure 3:
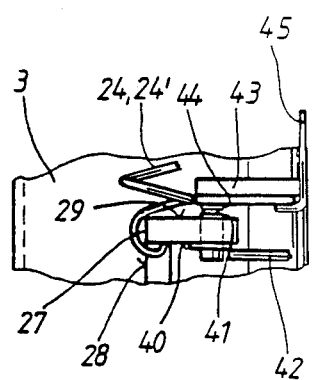
FIG. 3 shows a detailed view of switch contacts of a breaker switch.

A make-break switch function can also be performed by means of the seat-contact switch according to FIG. 3, which shows one of the guide extensions 27 of the moveable contact carrier 26 firmly connected to a carrying arm 40, which carries an electrically insulated switch contact 41 with a connection cable 42.

A further fixed switch contact 44 with a supply lead wire 45 is arranged in an electrically insulated manner on an outer-wall projection 43 of the base part 3.

In the position shown, the guide extension 27 rests against a stop 39, and the two switch contacts 41 and 44 are connected electrically.

Now, when the moveable contact carrier 26 is displaced in the wall slot 28 under the loading of the seat suspension 2, the two switch contacts 41 and 44 are separated from one another and the previously closed circuit is broken.

Figure 4:
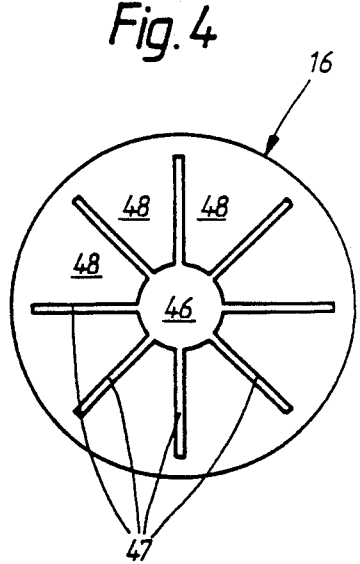
FIG. 4 shows a plan view of a resilient sheet-metal nut.

Finally, FIG. 4 shows a view of the fine thread sheet-metal nut 16. Its central bore 46 is equipped with a fine thread matching the fine thread bolt 8, and radial slots 47 extend outwards from the central bore 46 to end short of the outer edge of the sheet-metal nut 16. The sectors 48, limited by the radial slots 47, allow the sheet-metal nut 16 to experience elastic deformation in the axial direction of the central bore 46, as also represented by broken lines in FIG. 2.

With the fine thread nut 16 being in this form, it becomes possible to very simply carry out the adjustment of the adjusting screws in steps along the fine thread bolt 8 and provide for the automatic resetting of the adjusting device by overadjusted amounts.

In the exemplary embodiment, automatic resetting occurs because the nut thread opening, as are result of the elastic deformation of the sectors 48, jumps back by the amount of at least one flight of the fine thread on the fine thread bolt 8.

Since the helical gear and the sheet-metal nut 16 are only adjusted by a fraction of a revolution whenever the set suspension is loaded, the resetting operation occurs only rarely.

The sectors 48 cannot spring out in a downward direction towards the helical gear 10, since they are prevented from doing this by the disc 15.

Since deformations as a result of the settling of the seat suspension 2 amount to only fractions of millimeters under normal circumstances, without undue force being exerted, the seat-contact switch according to the present invention guarantees reliable functioning as a result of continuous adjustment in steps within the actuating device.

It is possible, of course, for the fine thread sheet-metal nut to be connected to the seat suspension in a non-rotating manner and for the fine thread bolt to be connected to the helical gear in a rotatable manner, and also to provide for the free-wheel, for example, by utilizing a radial toothed ring with correspondingly arranged spring pawls and fasten these fixedly, in terms of rotation, so as to rotate the toothed ring with them, in order to obtain kinematic reversals in relation to the exemplary embodiment illustrated.

Although the present invention has been described and illustrated in detail, it is to be clearly understood that the same is by way of illustration and example only, and is not to be taken by way of limitation. The spirit and scope of the present invention are to be limited only by the term of the appended claims.

What is claimed:

1. A seat-contact switch for generating a "seat occupied" signal when a seat suspension approaches a seat frame as a result of seat loading, utilizing an actuating device which has a moveable means articulatable on the seat suspension and a base part fastenable to the seat frame and which, as a result of relative movement between the moveable part and its base part, brings switch contacts into and out of conductive contact and which is self-adjusting to compensate both for elastic and permanent deformations of the seat suspension in order to prevent continuous actuation of the seat-contact switch when the seat suspension undergoes permanent deformation, comprising:
   that said moveable means of said actuating device is connected to its base part to be coaxially displaceable;
   said moveable means being prestressed by a spring means extending from the base part towards the seat suspension against a stop means on said base part;
   said actuating device including an adjusting means whose unloaded natural length is adjusted by means of a mechanically driveable adjusting screw means comprising an adjusting nut and a threaded bolt, one of which is non-rotatably connected while the other is rotatably connected to a free-wheel and which exerts a blocking effect on the rotatable one of the nut or bolt to prohibit rotation in a return direction; and
   wherein a difference in length between the distance from the seat suspension to the seat frame caused by deformation of the seat suspension and said unloaded natural length of the actuating device are compensated up to a maximum value by insertion of a deformation elastic member means on said adjusting nut and acting on said adjusting bolt; and
   wherein after the maximum value is reached, the elastic member means is moved at least partially into a changed position along the threaded bolt, when the seat suspension is relieved of its seat loading.

2. A seat-contact switch according to claim 1, wherein first switch contact means are guided in said base part for displacement away from a base part stop against a spring force; and wherein another switch contact means are moveable by said moveable means as a result of displacement of the moveable means relative to the base part under seat loading to cause the first and other switch contact means to initially be brought into electrical contact with one another and then to have the first switch contact displaced away from its base part stop.

3. A seat-contact switch according to claim 1, wherein a first switch contact means is fixedly arranged on the base part, and another switch contact means is connected with said moveable means, and wherein the first switch contact means are electrically connected when the seat suspension is unloaded and are separated when the moveable means moves relative to the base part upon seat loading.

4. A seat-contact switch according to claim 2, wherein the another switch contact means is located on a moveable contact carrier means which, when the seat suspension is unloaded, is prestressed against a stop on the base part as a result of bias by another spring.

5. A seat-contact switch according to claim 4, wherein said other spring is stretched between the moveable contact carrier and a spring mounting on the moveable means.

6. A seat-contact switch according to claim 4, wherein said another spring is stretched between the moveable contact carrier and a spring mounting on the base part; and wherein a further spring is stretched between the spring mounting on the base part and a spring mounting on the moveable means.

7. A seat-contact switch according to claim 4, wherein said moveable contact carrier is non-rotatably guided in the base part.

8. A seat-contact switch according to claim 1, wherein said adjusting screw means of the adjusting device is rotated as a result of the displacement of the moveable means relative to the base part by means of a coarse-pitch helical gear.

9. A seat-contact switch according to claim 8, wherein the coarse pitch helical gear is limited in rotation direction by a free-wheel means.

10. A seat-contact switch according to claim 9, wherein drive means for rotating the helical gear are provided on the base part, and wherein said adjusting nut is screwable on said threaded bolt, and wherein said helical gear includes a sleeve with a coarse thread attached to the free-wheel means.

11. A seat-contact switch according to claim 10, wherein said threaded bolt is articulated to the seat suspension in a non-rotating manner relative to its longitudinal axis, and wherein said adjusting nut is fixedly connected to the sleeve.

12. A seat-contact switch according to claim 10, wherein said threaded bolt is fixedly connected to said sleeve, and said adjusting nut is non-rotatably articulated to said seat suspension.

13. A seat-contact switch according to claim 9, wherein said free-wheel means comprises spring pawl means engaging in saw teeth on a toothed ring.

14. A seat-contact switch according to claim 13, wherein said spring pawl means are connected to the coarse pitch helical gear and said toothed ring is mounted on a moveable contact carrier means carried by the base part.

15. A seat-contact switch according to claim 13, wherein said spring pawl means are connected to the moveable contact carrier and said toothed ring is connected to the coarse pitch helical gear.

16. A seat-contact switch according to claim 10, wherein said base part is a hollow cylinder surrounding the sleeve, and wherein said drive means are spring hooks projecting into said hollow cylinder and engaging into flights of the coarse thread arranged on the outside of the sleeve.

17. A seat-contact switch according to claim 16, wherein said flights of the coarse thread are saw-toothed-shaped, to allow for the drive means to jump from one flight to the next when said free-wheel mean exerts its blocking effect and the seat suspension is unloaded.

18. A seat-contact switch according to claim 17, wherein said flights of the coarse thread extend at a pitch angle of 45° or less, relative to the longitudinal axis of the sleeve.

19. A seat-contact switch according to claim 10, wherein said threaded bolt has a fine thread screw.

20. A seat-contact switch according to claim 10, wherein said adjusting nut of the adjusting screw is configured as a disc with an internal thread center and having several radial slots, starting from the nut thread and extending radially outward toward, but stopping short of the outer edge of the disc; portions of the disc between the radial slots acting as resilient sector means which are elastically deformable for compensating for the difference in length of the adjustable means after a maximum value of said difference in length is reached, which causes said sector means to snap back automatically along the threaded bolt and again bring said internal thread into engagement with the bolt thread.

* * * * *